INVENTOR
Erich KOLB
By
his ATTORNEY

Nov. 2, 1971  E. KOLB  3,616,702
WINDSHIELD WIPER DRIVE
Filed Dec. 2, 1969  2 Sheets-Sheet 2
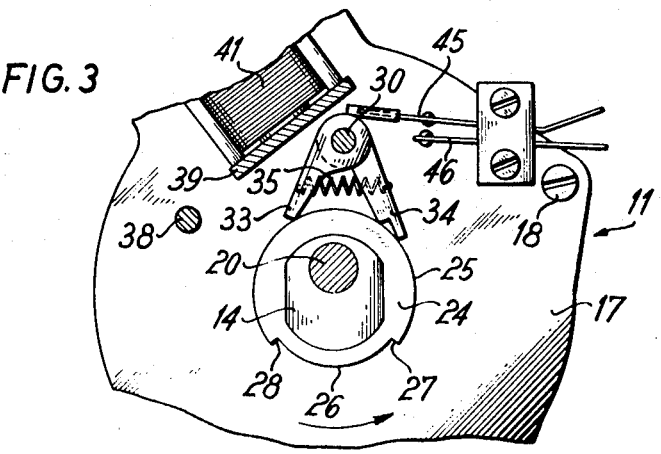
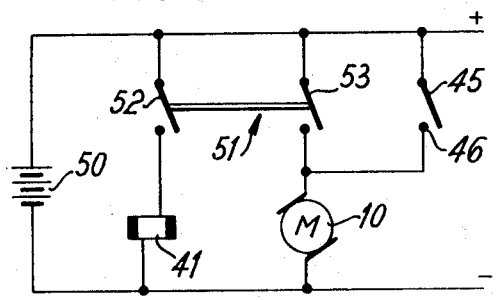
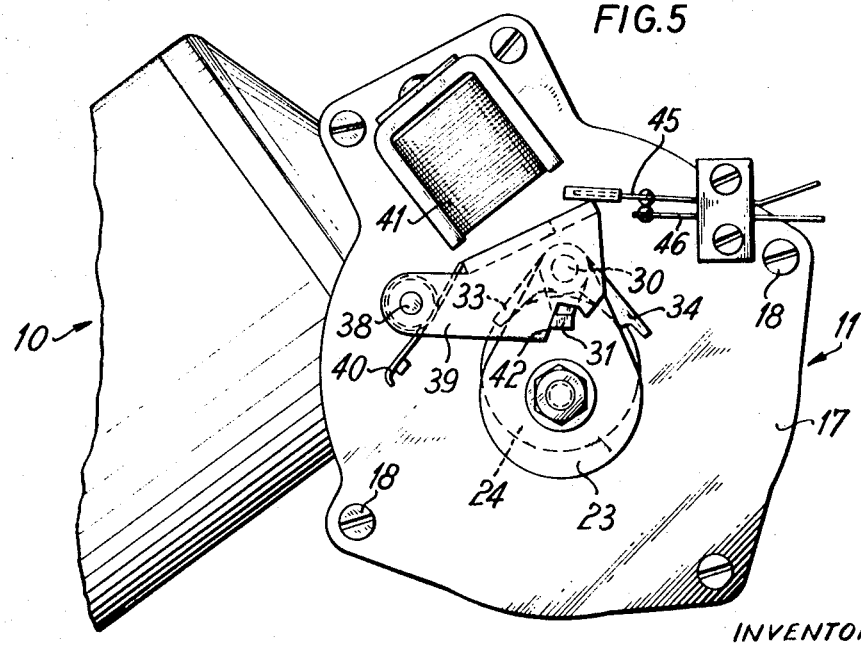
INVENTOR
Erich KOLB
By
his ATTORNEY United States Patent Office 3,616,702
Patented Nov. 2, 1971

3,616,702
WINDSHIELD WIPER DRIVE
Erich Kolb, Eisental, Germany, assignor to Robert
Bosch GmbH, Stuttgart, Germany
Filed Dec. 2, 1969, Ser. No. 881,391
Claims priority, application Germany, Dec. 3, 1968,
P 18 12 307.4
Int. Cl. A47l *1/00;* F16d *11/06;* F16h *21/18*
U.S. Cl. 74—50   9 Claims

ABSTRACT OF THE DISCLOSURE

A rotatable inner shaft has opposite ends and is eccentrically located for rotation in a hollow outer shaft which is arranged in axial parallelism. The shafts are rotatable independently of one another. An actuating arm is rigid with one end of the inner shaft projecting transversely thereto for rotation in a circular orbit about a predetermined axis. A shoulder is provided at the circumference of the outer shaft and extends at least substantially radially of the axis. A coupling member is mounted at the upper end of the inner shaft for pivotal movement between two positions in one of which it abuts against the ciricumference of the outer shaft and engages the shoulder to couple the shafts for joint rotation and another position in which it is out of abutment with the circumference and therefore out of abutment with the shoulder. Biassing means permanently urges the coupling member to its one position and into abutment with the circumference of the outer shaft. Drive means is provided for rotating the outer shaft and energizing means for energizing and de-energizing the drive means. Control means is operative for moving the coupling member to its other position and for thereupon effecting relative movement of the shafts in a sense causing radial displacement of the actuating arm with reference to its ciricular orbital path.

BACKGROUND OF THE INVENTION

The present invention relates generally to windshield wiper drives, and more particularly to a windshield wiper drive for motor vehicles and the like. It is already known to provide drive arrangements for windshield wipers with an electromotor which drives an actuating arm in rotation via a worm drive. The actuating arm is mounted on a shaft which is turnably but eccentrically located in a hollow shaft with the latter being rigidly connected with the worm wheel of the drive, and with the shaft carrying the arm at one end being provided at its other end with a disc to which there is connected a coupling member in pivotal relationship, the coupling member serving to couple the two shafts for joined rotation when the drive is actuated, with a control member being provided which, when the drive motor is de-energized, enters into the path of the pivoting coupling member to lift the same out of its coupling position and to thereupon effect a relative movement between the two shafts which causes the windshield actuating arm to be shifted radially of its orbital path and to thereby displace the windshield wipers which are connected to the arm, into a rest or parking position located outside of the area which they wipe when in motion.

In the constructions of this type which are known from the prior art the coupling member which serves to couple the two shafts for joint rotation is provided with a projection which extends into a curved cam track formed in one end face of the worm wheel which consists of synthetic plastic material. In this type of construction it is necessary that the constituent components be manufactured to relatively close tolerances and be assembled to similarly close tolerances if the coupling member is to be capable of performing its function properly. Nevertheless, it has been found that after extended use the cam track becomes worn and the play at the various pivots increases, with the effect that the coupling action for the two shafts is no longer reliable.

SUMMARY OF THE INVENTION

It is, accordingly, an object of the present invention to provide an improved windshield wiper drive which is not possessed of these aforementioned disadvantages.

More particularly it is an object of the present invention to provide such a windshield wiper drive which is very uncomplicated and capable of performing the desired functions in a highly reliable manner and over a lifetime far longer than what is known from the prior art.

A further object of the present invention is to provide such a drive which is largely independent in its operation from maintenance of strict manufacturing and installation tolerances.

In pursuance of the above objects, and others which will become apparent hereafter, one feature of the invention resides in a windshield wiper drive which comprises, briefly stated, a rotatable inner shaft having opposite ends and a hollow outer shaft surrounding the inner shaft and being independently rotatable with reference to the same. A windshield wiper actuating arm is rigid with one end of the inner shaft and projects transversely of the latter for rotation in a circular orbit about a predetermined axis. A shoulder is provided at the circumference of the outer shaft and extends at least substantially radially of this aforementioned axis.

At the other end of the inner shaft, that is the end which is opposite to the one where the actuating arm is provided, there is mounted a coupling member for pivotal movement between an operative position in which it abuts against the ciricumference of the outer shaft and engages the shoulder thereon to thereby couple the two shafts for joint rotation, and an inoperative position in which it is out of abutment with the circumference and thereby out of abutment with the shoulder so that the shafts are no longer coupled for rotation with one another. Biassing means permanently urges the coupling member to its operative position and into abutment with the circumference of the outer shaft. Drive means is provided for rotating the hollow outer shaft and energizing means serves for energizing and de-energizing the drive means. Finally, I provide control means for moving the coupling member to its second position and for thereupon effecting relative movement of the shafts in a sense causing radial displacement of the actuating arm with reference to its circular orbital path, in response to operation of the energizing means for de-energizing of the drive means.

Advantageously, the shoulder is provided on a ring flange which is secured to the outer shaft rigid therewith.

The construction according to the present invention makes it easy to provide a contact surface of adequate size between the coupling member and the shoulder at the circumference of the hollow outer shaft, and furthermore it is simple to provide the shoulder in such a manner that it is exactly normal to the force which is to be transmitted. The angle under which the force to be transmitted enters into the contact surfaces is influenced only to an insignificant extent by tolerance variations in the manufacture and assembly of the components.

If it is desired to conserve as much space as possible in radial direction of the drive, then it is advantageous to turnably journal a bolt or pin in the disc member which is fast with the rotatable inner shaft, and to mount on one end of this pin the coupling member whereas on the other end of the pin there is mounted an intermediate member which cooperates with the control means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 3 is a section taken on the line III—III of FIG. 1;

FIG. 4 is an electrical circuit diagram of the novel drive; and

FIG. 5 illustrates—in a view similar to FIG. 2—the drive in a different position than that shown in FIG. 2.

DESCRIPTION OF THE PREFERRED EMBODIMENTS

Figure 1:
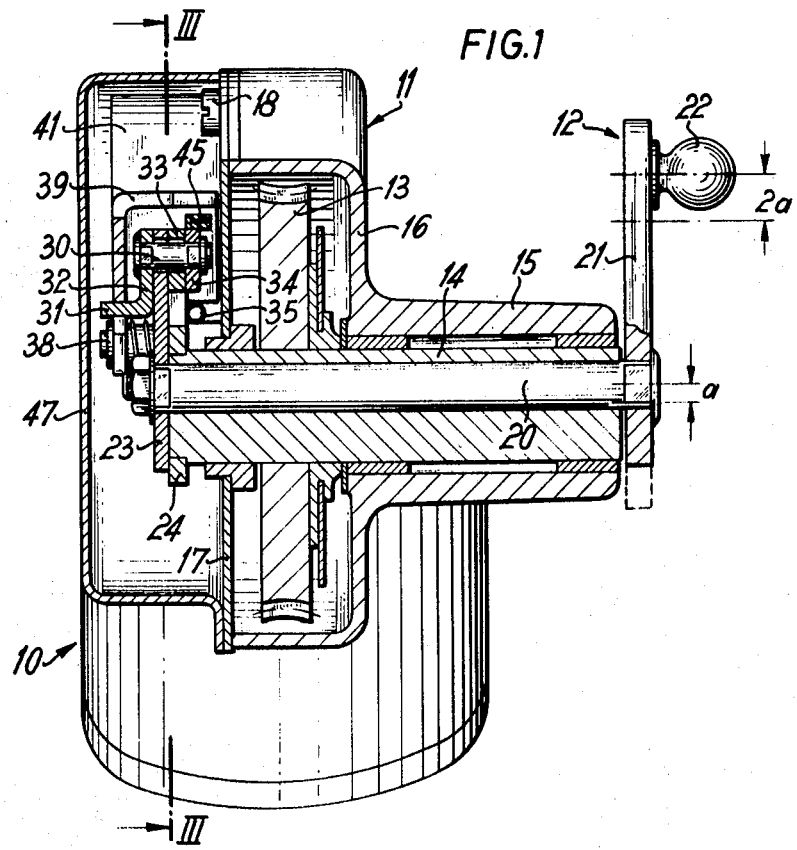
FIG. 1 is a somewhat diagrammatic fragmentary longitudinal section through a drive according to the present invention.

Discussing now the drawing in detail, it will be seen that reference numeral 10 identifies a conventional electromotor which drives a worm drive 11 and thereby causes a crank or windshield wiper actuating arm 12 to perform rotary movement in a circular orbital path. The worm wheel 13 of the worm drive 11 is mounted on a hollow shaft 14 fast therewith, and the shaft 14 is turnably mounted in a hub 15 of the housing 16. The worm gear of the drive, with which the worm wheel 13 meshes, is not illustrated but should be understood to be secured to the output shaft of the electromotor 10. A cover 17, preferably of sheet metal, closes the open side of the housing 16 and is secured to the latter releasably by means of screws 18 or analogous suitable fasteners.

As FIGS. 1 and 3 show most clearly, an inner shaft 20 is turnably mounted within the hollow outer shaft 14. The inner shaft 20 is, however, eccentric with reference to the outer shaft 14 by the distance a which is indicated in FIG. 1. Both opposite ends of the inner shaft 20 project axially beyond the outer shaft 14. At one axial end—that is the right hand end in FIG. 1—the inner shaft 20 carries the windshield wiper actuating arm 21 which is rigid with the shaft 20 and turns with the same. The arm 21 in turn carries in the region of its free end a suitably configurated—here spherical—coupling portion 22 by means of which the arm 21 is connectable to the linkage structure of a windshield wiper assembly which converts the circular orbital movement of the crank 12 into the reciprocatory movement of the wipers. The wipers themselves and the linkage arrangement therefor are not illustrated because in terms of the present invention their construction is not germane.

At the end opposite from the crank 12, that is at the left-hand end as seen in FIG. 1, the inner shaft 20 carries a disc or plate member 23 which is non-rotatable with reference to the shaft 20. Axially adjacent the disc member 23 is provided a radially projecting ring member 24 which surrounds the circumference of the outer shaft 14 and is connected with the latter so as to be rotatable therewith but not rotatable relative thereto. The member 24 comprises a section 25 of larger diameter and a section 26 of smaller diameter. Between the two sections there are provided shoulders 27 and 28 which extend at least substantially radially with reference to the axis of rotation of the hollow shaft 14. A pin 30 (compare FIG. 1) is turnably journaled in the disc member 23 and carries on one of its ends an intermediate lever 32 which is provided with an abutment projection 31. Furthermore, the pin 30 carries a loosely journaled arm 33 and a second arm 34 which constitutes a coupling member and is rotatable with but not rotatable relative to the pin 30. The arm 33 cooperates with the shoulder 27 and the arm 34 cooperates with the shoulder 28, with suitable biassing means—here in form of a helical contraction spring 35 (see FIG. 3)—being provided which urges both arms 33 and 34 inwardly towards the circumference of the shaft 14 and thereby of the member 24.

FIG. 1 shows that a pin 38 is provided on the cover 17, and that on this pin 38 there is pivotably mounted a control lever 39. A spring 40 (see FIG. 2) permanently urges the control lever 39 to move into the circular path described by the projection 31 of the lever 32.

Figure 2:
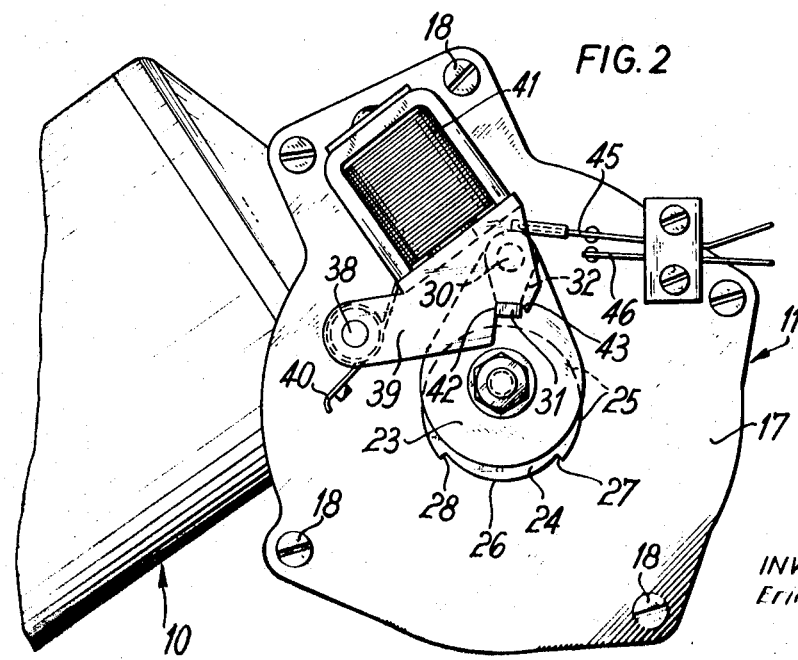
FIG. 2 is an end view of the embodiment shown in FIG. 1 with portions of the housing removed.

In accordance with the invention the control lever 39 is constructed and configured as the armature of an electromagnet 41 whose coil is secured to the cover 17. The control lever 39 is provided with two abutment faces 42 and 43 which are shown in FIG. 2 and which are spaced by a distance corresponding to the width of the projection 31. In the position illustrated in FIG. 2 the projection 31 extends into the space defined between the two abutment faces 42 and 43.

A pair of contact springs 45 and 46 are mounted on the cover 17, insulated from one another and with the spring 45 projecting somewhat beyond the spring 46. The forward electrically insulated end portion of the spring 45 projects into the orbital path of the arm 34 when the plate 23 is in the position relative to the hollow shaft 14 which is illustrated in FIGS. 1 and 2. When this is the case the arm 34 lifts the spring 45 off the spring 46. Subsequent to such lifting and in response to continued turning of the drive, the arm 34 again frees the spring 45 so that the latter resiliently abuts again against the spring 46. A protective cover 47 fastened to the cover 17 serves to protect the various components arranged in this region against damage or contamination from the exterior. The cooperation and purpose of the springs 45 and 46 with reference to the arm 34 will be described subsequently.

A battery 50 is provided—that is the conventional vehicle battery—and the contact spring 45 is conductively connected with the positive pole of this battery. Conversely, the contact spring 46 is connected with one terminal of the electrical motor 10 whereas the other terminal of the motor is connected to the negative terminal of the battery 50. A manually operated switch 51 with two coupled switch members 52 and 53 is provided for energizing and deenergizing the device. The element 52 is connected into the energizing circuit of the magnet 41 and the element 53 is connected in parallel with the contact springs 45 and 46 in the energizing circuit of the electromotor 10.

The contact springs 45 and 46 together constitute an end position switch which assures that—after the manually operable switch 51 has been turned to off position—the device will continue to operate until such time as the non-illustrated wipers have reached their rest or parking position in which they are withdrawn from the area of the windshield which they wipe when in operation. The purpose here is to assure that when the wipers are not in operation they will be located outside the normal wiping field of the windshield so as to be incapable of interfering with the vision of the vehicle operator. A further consideration is of course that such "retraction" of the windshield wipers enhances the aesthetic appearance of the vehicle.

FIGS. 1, 2, 3 and 5 show the device in the position in which the windshield wipers are at their park or rest position; in other words, the device is illustrated in the position in which the member 22 is displaced radially of its circular orbital path in outward direction and by a distance 2a corresponding to twice the eccentricity of the shaft 20 with reference to the shaft 14. When the member 22 moves to this position it causes the windshield wiper to move to their rest or parking position as already mentioned.

The lever 39 cooperates with the intermediate lever 32 and retains the disc member 23 so that the shaft 20 cannot rotate. At this time the arms 33 and 34 are not in abutment with the shoulders 27 and 28 so that the shafts 14 and 20 are not coupled for joint rotation. Furthermore, and this time the arm 34 has lifted the contact spring 45 out of conductive contact with the spring 46 so that the circuit of the electromotor 10 is interrupted.

If, now, the device is to be energized, the manually operable switch 51 is closed, thereby energizing the electromotor 10 and exciting the magnet 41. Rotation of the motor 10 now causes transmission of motion to the worm wheel 13 which in turn drives the shaft 14 in rotation. The magnet 41 draws the lever 39—which has been already returned by the projection 31 of the lever 32 almost to its inner actuated position—but the lever 39 continues to prevent the shaft 20 from rotating via the lever 32 and the disc member 33. The result of this retardation—which accordingly prevents the crank 12 from rotating along with the shaft 14—is a relative movement between the hollow shaft 14 and the shaft 20 which causes the crank 12 to be shifted radially in parallelism with itself. After the shaft 14 has gone through half a rotation the shaft 20 has moved downwardly (see FIG. 3) by double the extent of the eccentricity $a$, that is by the distance $2a$ shown in FIG. 1. At this time the member 22 has moved radially inwardly by the distance $2a$—that is downwardly in FIG. 1—and in so doing has moved the windshield wipers from their parking position into their operative position in which they are located in the windshield area which is to be wiped. Now the lever 39 releases the intermediate lever 32 and together with the same the shaft 20. At the same time the shoulders 27 and 28 have moved within contact of the arms 33 and 34 which now engage the respective shoulders and thus connect the hollow shaft 13 with the disc member 23 and thereby with the shaft 20 for joint rotation of the shafts. The shafts 14 and 20 now rotate together, causing the member 22 to perform its movement in a circular orbital path and to operate the windshield wipers in reciprocatory movement via the motion-translating linkage arrangement of the wipers.

During the movement of the disc member 23 which takes place during the first half turn of the hollow shaft 14, the arm 34 releases the contact spring 45 so that the same again abuts against the contact spring 46 and connects the electromotor 10 with the battery 50, bypassing the manual switch 51.

If, now, it is desired to terminate operation of the windshield wipers, the manually operable switch is turned to off position by the vehicle operator. This causes interruption of the circuit leading from the switch 51 to the motor 10 and of the supply of electric current to the magnet 41. Because contact is still in existence between the contact springs 45 and 46, so that electric energy continues to be supplied via the bypass constituted by the springs 45 and 46, such movement of the switch 51 to off position does not initially terminate the drive. However, the magnet 41 is de-energized, allowing the spring 40 to move the lever 39 into the path of movement of the projection 31. Latest after one rotation the projection 31 abuts against the lever 39 and becomes lodged—after momentary deflection of the lever 39—between the abutment faces 42 and 43 of the same is illustrated in FIG. 5. It is clear that the lever 39 now retains the projection 31 of the lever 32 against further movement, with the lever 32 being connected with the arm 34 via the pin 30. The arm 34, abutting against the shoulder 28, however has the tendency to continue movement with the rotating hollow shaft 14 and to shift the pin 30. This transmits a torque to the lever 32 and the arm 34, tilting the latter out of coupling position and de-coupling the shafts 14 and 20. As soon as this occurs, the disc member 23 and accordingly the crank 12—which is connected with it via the shaft 20—begin to lag behind the shaft 14 which continues to rotate at this time, causing again a relative movement between the shaft 14 and the shaft 20 and effecting radially outward shifting of the member 22 with reference to its circular orbital path by the distance $2a$. This distance $2a$ has been fully traversed when the hollow shaft 14 has completed half a rotation beginning with the moment at which the shaft 20 is retarded. The windshield wipers have now been returned to parking position.

Because retardation of the shaft 20 also causes a radial shifting of the plate 23 and the components carried by the same, the arm 34 abuts against the contact spring 45 after the hollow shaft 14 has carried out half of a rotation, and the arm 34 at this time lifts the contact spring 45 off the contact spring 46, interrupting the supply of electric energy to the motor 10 and de-activating the drive. The projection 31 on the lever 32 causes the lever 39 to move close to the magnet 41 so that only a small force is necessary for attracting the lever 39 when the device is next to be energized. For this reason the magnet 41 may be relatively weak.

The shoulders 42 and 43 retain the non-illustrated windshield wipers in their parking or rest position until the device is again energized.

The circuit diagram shown in FIG. 14 is believed to be self-explanatory and to requre no detailed discussion.

It will be understood that each of the elements described above, or two or more together, may also find a useful application in other types of applications differing from the types described above.

While the invention has been illustrated and described as embodied in a windshield wiper drive, it is not intended to be limited to the details shown, since varous modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A windshield wiper drive, comprising a rotatable inner shaft having opposite ends; a hollow outer shaft surrounding said inner shaft and being independently rotatable with reference to the same; journalling means journalling said inner shaft in said outer shaft for rotation, and for displacement between a first position in which said shafts are eccentric to a first extent and a second position in which said inner shaft is displaced with reference to said outer shaft so as to be eccentric relative to the same to a second different extent; a windshield-wiper actuating arm rigid with one end of said inner shaft and projecting transversely of the latter for rotation in a circular orbit about a predetermined axis; a shoulder provided at the circumference of said outer shaft and extending at least substantially radially of said axis; a coupling member mounted at the other end of said inner shaft for pivotal movement between an operative position in which it abuts against the circumference of said outer shaft and engages said shoulder to thereby couple said shafts for joint rotation in a common direction, and an inoperative position in which it is out of abutment with said circumference and thereby out of abutment with said shoulder; biasing means permanently urging said coupling member to said operative position and into abutment with said circumference of said outer shaft; drive means for rotating said hollow outer shaft; energizing means operable for energizing and de-energizing said drive means; and control means for moving said coupling member to said second position and for thereupon effecting movement of said inner shaft from said first position to said second position so as to cause radial displacement of said actuating arm with reference to its circular orbital path, in response to operation of said means for de-energizing of said drive means.

2. A windshield wiper drive as defined in claim 1, wherein said outer shaft comprises a radially outwardly projecting annular flange projecting from the circumference of said outer shaft and being provided with said shoulder.

3. A windshield wiper drive as defined in claim 2, wherein said annular flange is a discrete annular element surrounding and rigid with said outer shaft.

4. A windshield wiper drive as defined in claim 1; further comprising a disc member mounted on said other end of said inner shaft for rotation therewith; a pin journalled in said disc member and having opposite ends one of which carries said coupling member; and an intermediate member mounted on the other end of said pin and cooperating with said control means.

5. A windshield wiper drive as defined in claim 4; further comprising an additional shoulder provided at the circumference of said outer shaft; and an arresting member loosely pivotably mounted on said pin and cooperating with said additional shoulder in a sense preventing rotation of said outer shaft oppositely said common direction.

6. A windshield wiper drive as defined in claim 1, said control means comprising a control lever constructed and configurated as the armature of an electromagnet; and further comprising an energizing coil cooperating and constituting with said control lever said electromagnet; and wherein said energizing means is associated with said coil.

7. A windshield wiper drive as defined in claim 1; further comprising a housing accommodating said shafts and having an open end and a cover removably closing said open end; and wherein said other end of said inner shaft and a portion of said outer shaft project through said cover to the exterior of said housing and said coupling member and control means are located at the exterior of said housing.

8. A windshield wiper drive as defined in claim 1, wherein said energizing means comprises a manually operable switch.

9. A windshield wiper drive as defined in claim 1, wherein said biasing means comprises spring means.

References Cited

UNITED STATES PATENTS

| 3,091,128 | 5/1963 | De Rees et al. | 15—250.17 |
| 3,253,206 | 5/1966 | Romanowski | 15—250.17 |
| 3,353,425 | 11/1967 | Abel, Jr. | 74—600 |
| 3,445,145 | 5/1969 | Carroll et al. | 308—15 |

WILLIAM F. O'DEA, Primary Examiner

W. S. RATLIFF, JR., Assistant Examiner

U.S. Cl. X.R.

15—250.17; 192—71